(12) United States Patent
Maessen

(10) Patent No.: US 7,383,390 B1
(45) Date of Patent: Jun. 3, 2008

(54) RESOURCE-LIMITED DIRECTORIES WITH FINE-GRAINED EVICTION

(75) Inventor: Jan-Willem Maessen, Somerville, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 648 days.

(21) Appl. No.: 10/968,736

(22) Filed: Oct. 19, 2004

(51) Int. Cl.
*G06F 12/00* (2006.01)
(52) U.S. Cl. ...................... 711/133; 711/144
(58) Field of Classification Search ............. None
See application file for complete search history.

(56) References Cited

U.S. PATENT DOCUMENTS 5,671,444 A * 9/1997 Akkary et al. ............... 710/52
6,745,297 B2 * 6/2004 Kruckemyer et al. ........ 711/145
6,901,485 B2 * 5/2005 Arimilli et al. .............. 711/135

OTHER PUBLICATIONS

Tanenbaum, "Structured Computer Organization", © 1984 Prentice-Hall, p. 10-12.*

* cited by examiner

*Primary Examiner*—Brian R. Peugh
(74) *Attorney, Agent, or Firm*—Osha Liang LLP

(57) ABSTRACT

A system including a memory, a first processor operatively connected to a first cache, a second processor operatively connected to a second cache, a directory implemented in hardware operatively connected to the first cache, the second cache, and the memory, wherein the directory comprises at least one location, and wherein the at least one location is configured to store a first entry and a second entry.

20 Claims, 4 Drawing Sheets

RESOURCE-LIMITED DIRECTORIES WITH FINE-GRAINED EVICTION

This invention was made with U.S. Government support under Contract No. NBCH020055 awarded by the Defense Advanced Research Projects Administration. The U.S. Government has certain rights in the invention.

BACKGROUND

In recent years, shared-memory multiprocessors have gained wide-spread attention because of the simplicity of the shared-memory parallel programming model. However, allowing the processors in a multiprocessor system to share memory complicates the design of the memory hierarchy. One of the most prominent issues that must be addressed in the design of memory hierarchy is cache coherency (also referred to as cache consistency). The issue of cache coherency arises when more than one processor in the multiprocessor system includes a cache.

The caches in the multiprocessor system are said to be coherent if all the copies of a memory location in the multiple caches remain consistent when the content of that memory location are modified. Multiprocessor systems use a cache coherency protocol to maintain cache coherency. Maintaining cache coherency typically involves taking special action when one processor writes to a block of data in the memory that exists in the cache of one or more processors in the multiprocessor system. The corresponding data in the other caches, which is now stale, must either be invalidated or updated, depending on the cache-coherency protocol. Further, cache-coherency protocols also include functionality to perform certain actions when a read miss occurs (i.e., when data is not present in the cache and thus, is retrieved and loaded into the cache). The cache-coherency protocol typically includes functionality to perform the aforementioned actions. The various cache coherency protocols typically differ in the manner in which a determination is made whether data in memory is shared, the manner in which a determination is made as to which caches contain copies of the data, and the manner in which copies of the data are updated and/or invalidated.

Two primary mechanisms used to implement cache coherency protocols in multiprocessor systems include a snoopy cache mechanism, and a directory-based mechanism. Multiprocessor systems implementing a snoopy cache mechanism require each cache in the multiprocessor system to track all cache coherency transactions and determine when cache-coherency transactions should be performed for a given piece of shared data. Further, multiprocessor systems using a snoopy cache mechanism typically do not store the state of each piece of cache data in an associated cache directory. In stead the state of each piece of cache data is stored in the corresponding cache. Further, the processors are responsible for tracking the state of caches with which they are associated with. In addition, invalidating a piece of cache data in a cache is typically performed using a broadcast mechanism.

In contrast, multiprocessor systems implementing a directory-based cache mechanism maintains a separate directory associated with the memory. This directory stores the state of data within the memory. More specifically, the directory implementing the directory-based cache mechanism is configured to store state information about a subset of data within the memory. Thus, when a piece of data in the main memory is cached in a cache associated with a processor in the multiprocessor system, the directory uses a property of the piece of data that was cached (e.g., a physical address of the piece of data in memory) to index into a specific location in the directory. A determination is subsequently made as to whether the location in the directory is currently being used. If the location is empty, then the state of the piece of data is entered into the directory.

Alternatively, if the location is not empty, then a determination is made about whether the location is being used to track the state of the same piece of data that was cached (i.e., the same piece of data was previously cached in another cache in the multiprocessor system). If the location is being used to track the state of the piece of data was cached, then the state information of the piece of data may be updated to reflect that the piece of data is now cached in an additional cache.

However, if the location is not being used to track the state of the same piece of data that was cached, then the current contents of the location are cleared and the state information of the piece of data that was cache is stored at the location. In addition, the removal of cache entries from the cache results in the generation of messages to the directory to remove the previous contents of the location in the directory. The message indicates that the corresponding cache entries in the cache have been removed.

SUMMARY

In general, in one aspect, the invention relates to a system comprising a memory, a first processor operatively connected to a first cache, a second processor operatively connected to a second cache, a directory implemented in hardware operatively connected to the first cache, the second cache, and the memory, wherein the directory comprises at least one location, and wherein the at least one location is configured to store a first entry and a second entry.

In general, in one aspect, the invention relates to A method for storing cache entry information into a directory, comprising obtaining a physical address associated with the cache entry information, indexing into the directory using the physical address to obtain a location, determining whether an empty entry exists at the location to store the cache entry information, and if an empty entry exists in the location, storing the cache entry information in the empty location, wherein the location in the directory comprises a plurality of entries, wherein the directory is implemented in hardware.

In general, in one aspect, the invention relates to a method for updating a directory comprising receiving a notification of an eviction of a cache entry, obtaining a physical address associated with the cache entry, indexing into a location in the directory using the physical address, searching a plurality of entries at the location to obtain an entry corresponding to the notification, and removing contents of the entry, wherein the directory is implemented in hardware.

Other aspects of the invention will be apparent from the following description and the appended claims.

DETAILED DESCRIPTION

Figure 1:
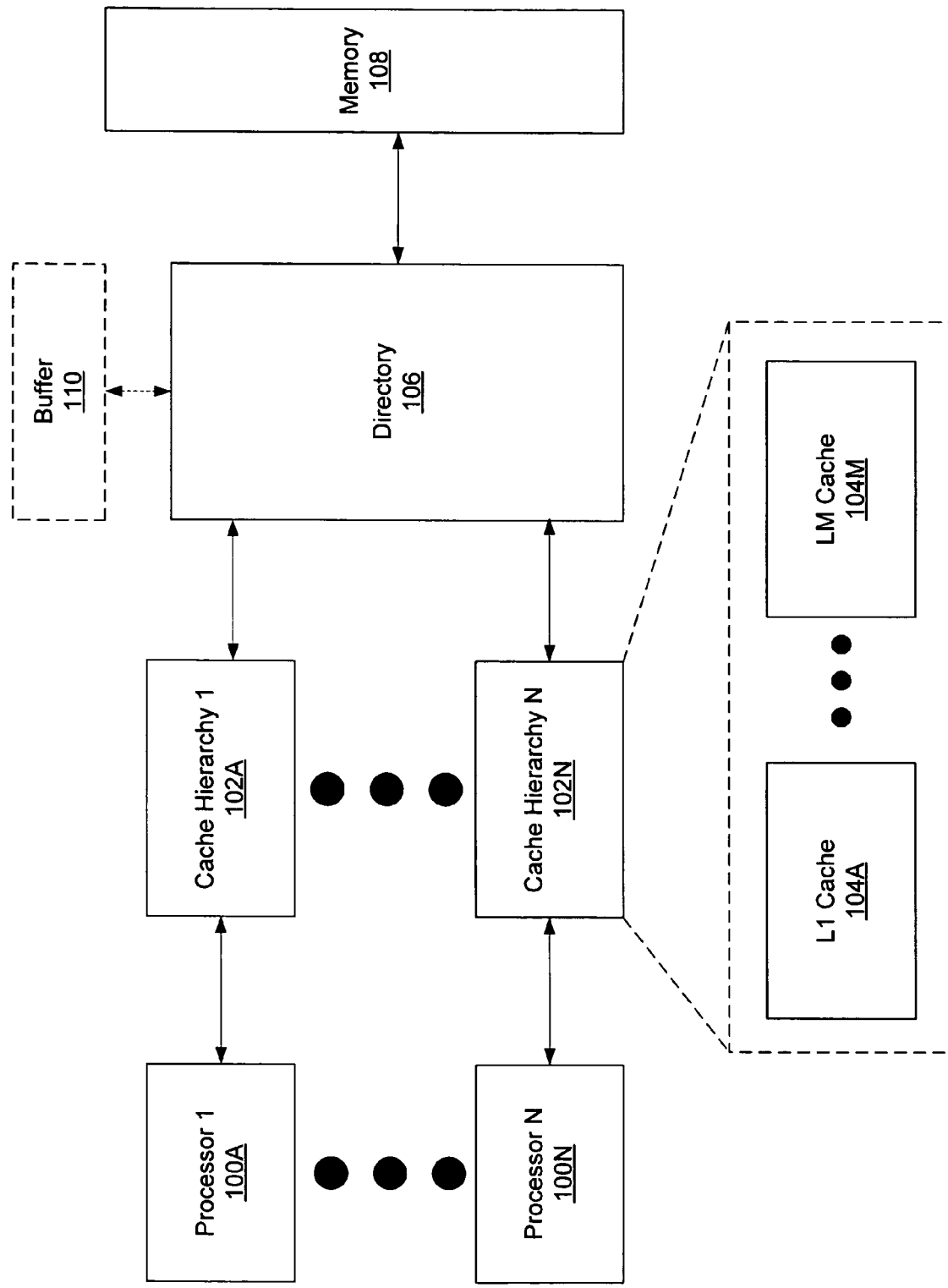
FIG. 1 shows a system in accordance with one embodiment of the invention.

Specific embodiments of the invention will now be described in detail with reference to the accompanying figures. Like elements in the various figures are denoted by like reference numerals for consistency. Further, the use of "ST" in the drawings is equivalent to the use of "Step" in the detailed description below. In the following detailed description of embodiments of the invention, numerous specific details are set forth in order to provide a more thorough understanding of the invention. In other instances, well-known features have not been described in detail to avoid obscuring the invention.

In general, embodiments of the invention relate to a method and system for a directory implemented in hardware configured to implement a directory-based cache-coherency protocol in accordance with one embodiment of the invention. Further, in one embodiment of the invention, the directory is configured to store multiple entries at a given location within the directory. Further, in one embodiment of the invention, the directory is configured to store multiple entries each corresponding to a different cache entry referencing a different physical address in a single location within the directory. Further, embodiments of the invention provide a method and system configured to evict one or more entries at a given location in the directory.

In general, embodiments of the invention provide a directory that may be used in a multiprocessor machine having tens of thousands processors. Further, embodiments of the invention provide a directory that decreases the communication traffic between processors by allowing eviction of single entries within the directory. Further, embodiments of the invention provide a directory that only requires a small amount of information to be stored with each entry.

FIG. 1 shows a system in accordance with one embodiment of the invention. The system includes one or more processors (Processor 1 (100A), Processor N (100N)) each operatively connected to a corresponding cache hierarchy (cache hierarchy 1 (102A), cache hierarchy N (102N)). The cache hierarchy (cache hierarchy 1 (102A), cache hierarchy N (102N)) may include one or more caches (e.g., L1 Cache (104A), LM Cache (104M)). Each cache (e.g., L1 Cache (104A), LM Cache (104M)) in the cache hierarchy (cache hierarchy 1 (102A), cache hierarchy N (102N)) is configured to store one or more cache entries. Each cache entry stores a copy of a piece of data currently in memory (108). Each copy of the piece of data is associated with a physical address.

Those skilled in the art will appreciate that not all processors (Processor 1 (100A), Processor N (100N)) in the system have to be operatively connected to a cache hierarchy (cache hierarchy 1 (102A), cache hierarchy N (102N)). Further, each cache hierarchy (cache hierarchy 1 (102A), cache hierarchy N (102N)) in the system does not need to include a uniform number of caches (e.g., L1 Cache (104A), LM Cache (104M)). Continuing with the discussion of FIG. 1, each cache hierarchy (cache hierarchy 1 (102A), cache hierarchy N (102N)) is operatively connected to a directory (106). The directory (106), in turn, is operatively connected to the memory (108). In addition, the directory (106) may be operatively connected to a buffer (110).

Note also that multiple processors may themselves share a cache (as in the case of multi-core processors). In such as cases, an internal consistency protocol is may also be implemented within this processor-cache subsystem. The internal consistency protocol is separate from the consistency protocol between the cache and memory. However, those skilled in the art will appreciate that a directory protocol in accordance with the invention could also be used within this subsystem.

Continuing with the discussion of FIG. 1, in one embodiment of the invention, the directory (106) is configured to store cache entry information associated with the cache entries stored in the associated caches (e.g., L1 Cache (104A), LM Cache (104M)). The cache entry information may include, but is not limited to, a physical address associated with the cache entry (i.e., the physical address of the piece of data referenced by the cache entry), a value indicating the processor (Processor 1 (100A), Processor N (100N)) operatively connected to the cache (e.g., L1 Cache (104A), LM Cache (104M)) in which the cache entry is stored, state information associated with the cache entry (e.g., invalid, owned, shared, exclusive, etc.), etc. In addition, the directory (106) is configured to store, remove, and update cache entry information in accordance with a cache coherency protocol. In one embodiment of the invention, the directory (106) may implement one of the following cache-coherency protocols: a Modified-Shared-Invalid (MSI) protocol, a Modified-Exclusive-Shared-Invalid protocol, and a Modified-Owned-Exclusive-Shared-Invalid protocol. Those skilled in the art will appreciate that other cache-coherency protocols may be used. An embodiment of the MSI protocol, in accordance with one embodiment of the invention, is described below. In one embodiment of the invention, the directory uses point-point communication with individual processors (Processor 1 (100A), Processor N (100N)) to enforce cache coherency.

In one embodiment of the invention, the buffer (110) is configured to store recently removed cache entry information from the directory (106). Further, the buffer (110) may include functionality to queue incoming requests to store, remove, and update cache entry information in the directory (106) prior to the directory (106) processing the requests.

Though not shown in FIG. 1, in one embodiment of the invention, the directory (106) may be located in a memory controller (not shown) associated with the memory (108). Alternatively, in one embodiment of the invention, the directory (106) may be integrated within the cache hierarchy (cache hierarchy 1 (102A), cache hierarchy N (102N)).

Further, those skilled in the art will appreciate that while only a single directory (i.e., directory (106)) is shown in FIG. 1, the system may include additional directories. In addition, those skilled in the art will appreciate that while only a single memory (i.e., memory (108)) is shown in FIG. 1, the system may include separate portions of memory that are distributed across the system. Further, those skilled in the art will appreciate that in systems supporting multiple directories and separate portions of memory, all processors (Processor (1 (100A), Processor N (100N)) accessing a given piece of data in a given portion of memory must refer to the same directory (e.g., directory (106)) to obtain cache-coherency information, etc.

Figure 2:
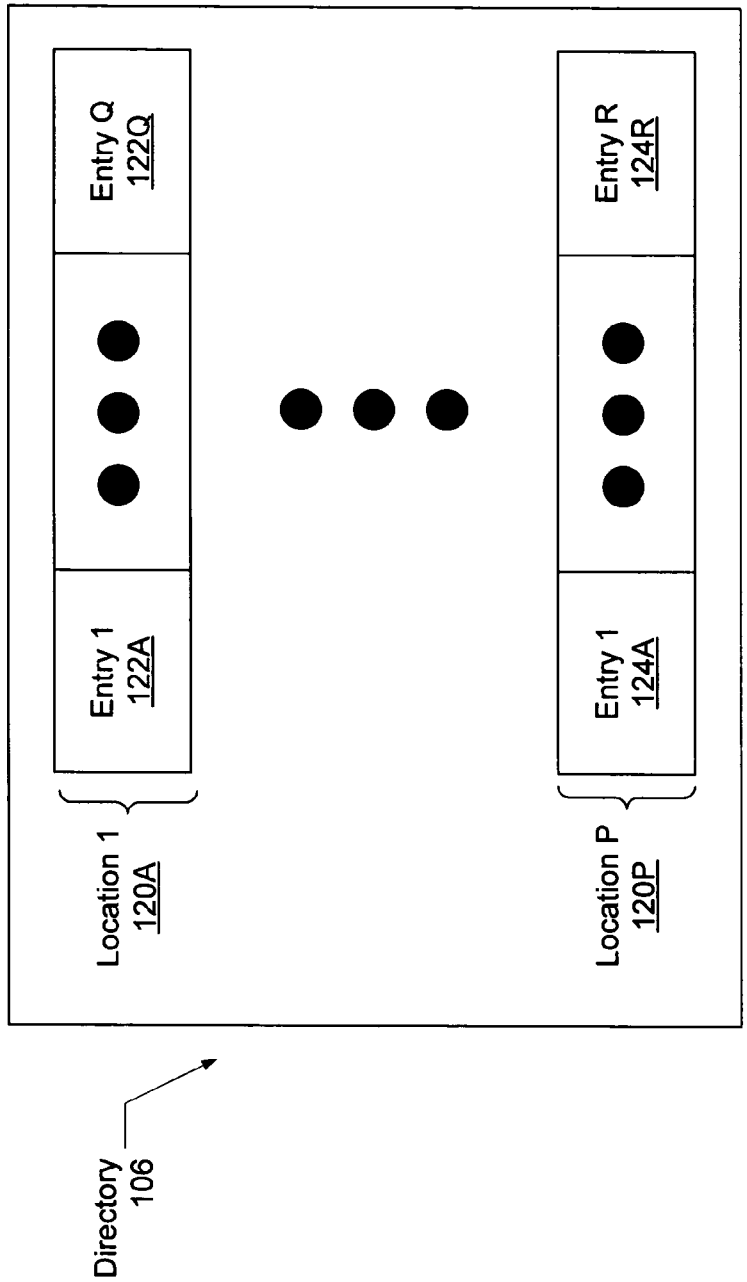
FIG. 2 shows a directory in accordance with one embodiment of the invention.

FIG. 2 shows a layout of the directory in accordance with one embodiment of the invention. In the embodiment shown in FIG. 2, the directory (106) includes one or more locations (location 1 (120A), location P (120P)). In one embodiment of the invention, the directory (106) includes functionality to index to a particular location (location 1 (120A), location P (120P)) using an address. Further, in one embodiment of the invention, the directory (106) uses the physical address associated with the piece of data in the corresponding cache entry to index into a location (location 1 (120A), location P (120P)) for storing the cache entry information. Alternatively, a virtual address may be used.

In one embodiment of the invention, a hash function is used to by the directory (106) to index into a particular location (location 1 (120A), location P (120P)). The hash function may use, for example, a certain number of low-order bits from the physical address as input. In one embodiment of the invention, the hash function is configured such that multiple physical addresses index to the same location in the directory (106).

In one embodiment of the invention, each location (location 1 (120A), location P (120P)) may include one or more entries. For example, location 1 (120) includes entry 1 (122A) through entry Q (122Q), and location P (120P) includes entry 1 (124A) through entry R (124R). Those skilled in the art will appreciate that the number of entries at each location (location 1 (120A), location P (120P)) does not have to be uniform. Further, in one embodiment of the invention, each location includes between four and eight entries. In one embodiment of the invention, the number of entries available at a given location may be pre-determined. Alternatively, the number of entries at a given location may be dynamically determined using system performance statistics. Continuing with the discussion of FIG. 2, the directory (106) typically includes functionality to concurrently store cache entry information referencing different physical addresses at the same location in different entries (e.g., entry 1 (122A), entry Q (122Q), etc.). Further, the directory (106) typically includes functionality to remove the contents (i.e., cache entry information) from a single entry at a particular location (location 1 (120A), location P (120P)).

Figure 3:
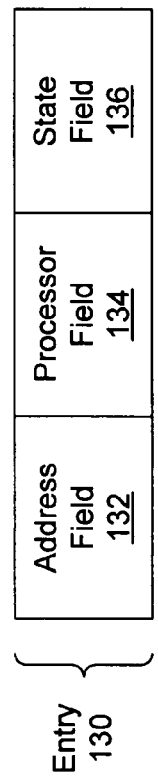
FIG. 3 shows an entry in accordance with one embodiment of the invention.

FIG. 3 shows an entry in accordance with one embodiment of the invention. In the embodiment shown in FIG. 3, the entry (130) includes an address field (132), a processor field (134), and a state field (136). In one embodiment of the invention, the address field (132) stores the physical address (or a portion thereof) associated with the data stored in the corresponding cache entry. In one embodiment of the invention, the processor field (134) stores information used to identify the processor (Processor 1 (100A), Processor N (100N)) associated with the cache in which the corresponding cache entry is stored. In one embodiment of the invention, the state field (136) stores the value of the state of the corresponding cache entry.

The following example illustrates the information that would be stored in the directory (106) using the fields described in FIG. 3. Assume that data at physical address (A1) is loaded into a cache operatively connected to processor X (PX). Thus, the corresponding entry in the directory may store the following information. The address field contains the value A1, the processor field contains the value PX, and the state field contains the value, for example, "owner."

In one embodiment of the invention, if multiple caches contain a cache entry for the same piece of data from memory, then one entry (as opposed to multiple entries) may be used to store the corresponding cache entry information. For example, assume that data at physical address (A2) is stored in a cache associated with processor X (PX) and a cache associated with processor Y (PY), then the corresponding cache entry information may be stored in one of two ways. First the cache entry information may be stored in two entries at the same location in the directory. Alternatively, one entry may be used to store the cache entry information for both cache entries. For the latter case, the corresponding entry in the directory may store the following information: the address field contains the value A2, the processor field contains the values PX and PY, and the state field contains the value, for example, "shared."

Figure 4:
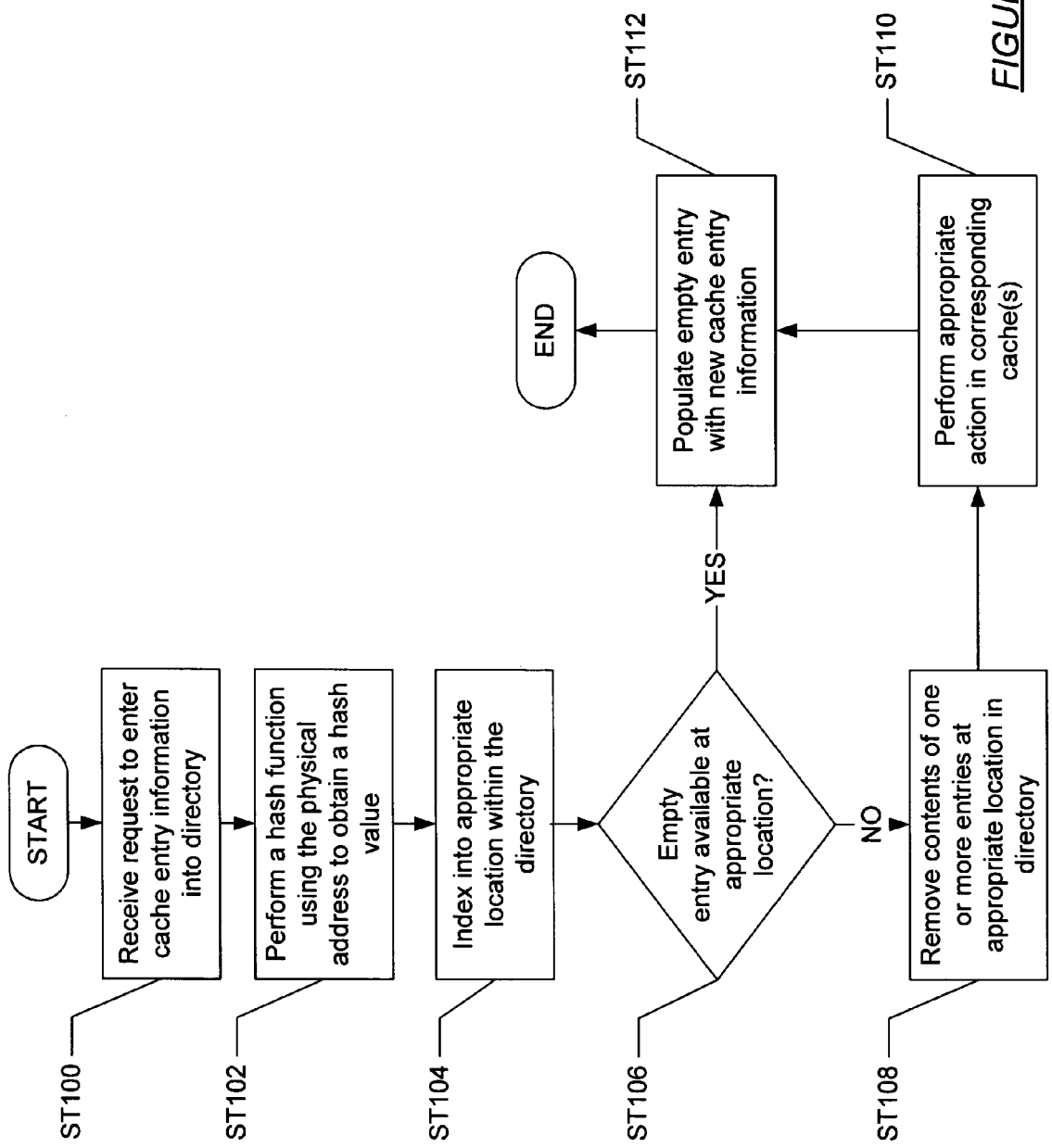
FIGS. 4 and 5 show flowcharts in accordance with one embodiment of the invention.
Figure 5:
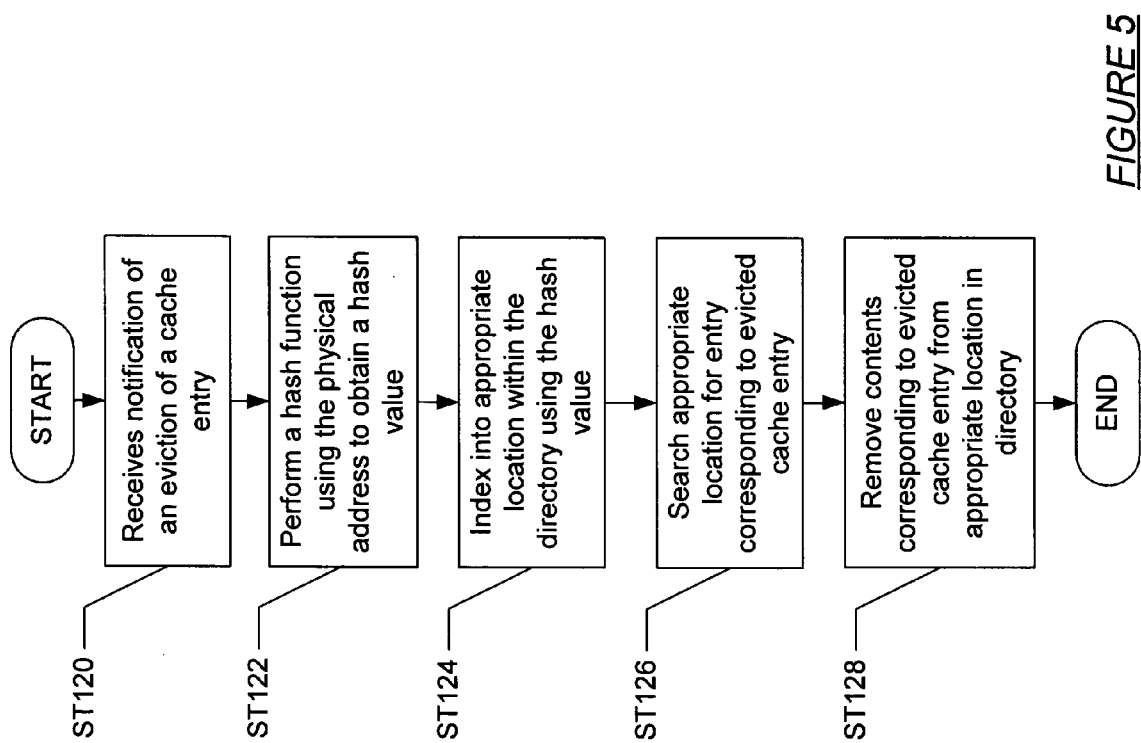

FIGS. 4 and 5 show flowcharts in accordance with one embodiment of the invention. More specifically, FIG. 4 shows a method for populating an entry in the directory with cache entry information. A request to enter cache entry information is initially received by the directory (ST100). The request may be the result, for example, of a request to insert a cache entry into a cache operatively connected to the directory. As noted above, the cache entry information typically includes a physical address associated with the data. The physical address (or a portion thereof) is used as input into a hash function to obtain a hash value (ST102).

The hash value is subsequently used to index into a particular location within the directory (ST104). The directory subsequently queries the location to determine whether there is an empty entry that may be used to store the new cache entry information (i.e., the cache entry information received in ST 100) (ST106). If there is an empty entry at the location, then the empty entry is populated with the new cache entry information (i.e., the various fields in the entry are populated with the new cache entry information) (ST112). Alternatively, if there are no empty entries at the location, then the directory proceeds to remove the contents (i.e., previously stored cache entry information) of one or more entries (as determined by the cache-coherency protocol) at the location (ST108).

The directory proceeds to perform the appropriate actions, as specified by the cache-coherency protocol in response to the removal of the contents of one or more entries at the location (ST110). In one embodiment of the invention, the affected caches are updated to reflect the removal of the cache entry information from the directory (i.e., corresponding cache entries are removed from the cache). The directory, upon receiving confirmation that the cache entries have been removed, subsequently removes the cache entry information corresponding to one or more cache entries in the cache that have been removed from the corresponding cache. Once the directory removes the appropriate cache entries, the method proceeds to ST112.

The following example shows the operation of the directory in accordance with embodiments of the invention shown in FIG. 4. Assume that data from memory having a physical address (A1) is loaded into a cache operatively connected to processor X (PX). In accordance with the method shown in FIG. 4, the directory would use the physical address (A1) as input to a hash function to obtain a hash value. The hash value is then used to index to a location in the directory. The location is subsequently searched to determine whether there is an empty entry. In this example, assume that an empty entry is present. Thus, the directory may proceed to store the following information: the address field contains the value A1, the processor field contains the value PX, and the state field contains the value, for example, "owned."

In one embodiment of the invention, instead of removing the contents of an entry at the location (i.e., ST108), the directory may generate an interrupt which prompts associated software to extend the number of entries at the location (i.e., allocation space in memory to store one or more entries associated with the location). Once the number of entries at the location has been increased, the directory may store the corresponding cache entry information into the appropriate software data structure representing an entry. Those skilled in art will appreciate that different policy determinations may be made with respect to when to use software to extend the number of entries associated with a particular location in the directory.

FIG. 5 shows a method for removing the contents of an entry in the directory after a corresponding cache entry has been evicted in accordance with one embodiment of the invention. Initially, the directory receives notification of an eviction of a cache entry from a cache operatively connected to the directory (ST120). The directory subsequently obtains the physical address of the data referenced by the evicted cache entry and performs a hash function using the physical address (or a portion thereof) to obtain a hash value (ST122). The directory subsequently uses the hash value to index into an appropriate location within the directory (ST124).

Once the appropriate location has been found, the entries at the location are searched to obtain the entry corresponding to the evicted cache entry (ST126). In one embodiment of the invention, searching for the entry corresponding to the evicted cache entry involves searching for the entry at the location in which the contents of the various fields (e.g., address field, processor field, state field, etc.) match those of the evicted cache entry. Once the corresponding entry at the location has been found, the contents of the entry are removed from the directory (ST128).

The following example shows the operation of the directory in accordance with embodiments of the invention shown in FIG. 5. Assume that a cache entry containing data having a physical address (A1) is evicted from a cache operatively connected to processor X (PX). In accordance with the method shown in FIG. 5, the directory uses the physical address (A1) as input to a hash function to obtain a hash value. The hash value is then used to index to a location in the directory. The location is subsequently searched to determine whether an entry corresponding to the evicted cache entry exists. In this example, the directory searches for an entry containing the following information: an address field containing a value of A1, a processor field containing the value PX, and a state field containing the value, for example, "owned." Once an entry having the aforementioned information is found, the contents of the entry is removed.

The following an example of an MSI protocol in accordance with one embodiment of the invention. Those skilled in the art will appreciate that while the following example describes one implementation of a cache-coherency protocol that may be implemented using embodiments of the invention, the invention is not limited to the described cache-coherency protocol. The following embodiment describes a MSI-based protocol without queuing in accordance with one embodiment of the invention. The MSI-based protocol is described below.

When a processor (p) attempts to read data at address (A) without an intent to modify the data, the following may steps occur: (1) processor (p) sends a "Shared" request for data at address (A) to the directory; (2) If there is not an available entry to store the cache entry information, then the directory returns "Retry" to processor (p) and initiates a capacity eviction (described below); (3) if there is an entry (A, p', Modified), the directory returns "Retry" to processor (p) and initiates a downgrade request (described below); (4) otherwise, an available entry is assigned (A, p, Shared); (5) the data at address (A) is fetched by the directory and returned to processor (p); and (6) processor (p) stores a cache entry in the associated cache having the following cache entry information: address (A) and state is "Shared."

When a processor (p) attempts to read data at address (A) with intent to modify the data, the following steps may occur: (1) processor (p) sends an "Modified" request for address (A) to the directory; (2) if any entries in directory are assigned to address (A), the directory returns "Retry" to processor (p) and initiates an ownership eviction on the appropriate location in the directory (described below), (3) if there are no available entries, the directory returns "Retry" to processor (p) and initiates a capacity eviction (described below) on the appropriate location in the directory, (4) otherwise, an available entry is assigned (A, p, Modified); (5) the data at address (A) are then fetched by the directory and returned to processor (p); and (6) processor (p) stores a cache entry in the associated cache having the following cache entry information: address (A) and state is "Modified."

When a processor (p) requests an upgrade of all entries corresponding to address (A) from "Shared" to "Modified," the following steps may occur: (1) processor (p) sends an "Upgrade" request for data at address (A) to the directory; (2) if any other entries are assigned to the data at address (A), the directory returns "Retry" to processor (p) and initiates an upgrade eviction (described below) at the appropriate location in the directory; (3) otherwise, the state of the entry (A, p, Shared) is upgraded to (A, p, Modified); (4) an upgrade acknowledgment of entry corresponding to (A, p, Modified) is sent to the processor (p); and (5) otherwise, the state of the cache entry corresponding to address (A) is changed from "Shared" to "Modified" (or to "Exclusive" if a MESI protocol is used).

When processor (p) evicts a cache entry corresponding to data stored at address (A) having a state of "Shared" or "Exclusive" from its cache, the following steps may occur: (1) processor (p) sends an "Evict" request corresponding to the cache entry to the directory; (2) the state of the entry in the directory corresponding to the cache entry is changed from "Shared" or "Exclusive" to "Invalid"; (3) an evict acknowledgment is returned to processor (p); (4) the cache entry associated with address (A) is removed from the processor (p) cache.

When a processor (p) evicts a cache entry corresponding to data stored at address (A) having a state of "Modified" from the processor (p) cache, the following steps may occur: (1) processor (p) sends a "Modified" request for the cache entry corresponding to data stored at address (A) along with the data; (2) the directory writes the data back to memory; (3) the state of the corresponding entry in the directory (i.e., (A, p, Modified)) is changed to invalid; (4) a modified acknowledgment is returned to processor (p); and (5) the cache entry correspond to data at address (A) is removed from the processor (p) cache.

When processor (p) writes back the data of address (A), but retains a copy in its cache, the following steps may occur: (1) processor (p) sends a "Writeback" request for data at address (A) to the directory, along with the data; (2) the directory writes the data back to memory at address (A); (3) the state of the corresponding entry in the directory is changed from (A, p, Modified) to (A, p, Shared); (4) a writeback acknowledgment is returned to processor (p); and (5) the state of the cache entry corresponding to data at address (A) is downgraded from Modified to Shared in the processor (p) cache.

The following steps may occur during an upgrade eviction: (1) find an entry (A, p', Shared) where p'≠p', and send an Eviction Request to processor (p); (2) if every entry at the location corresponding to address (A) except for entry (A, p, Shared) has received an eviction request, proceed to (3), otherwise go to (1); (3) wait until every entry corresponding to address (A) is invalidated, except for (A, p, Shared), the waiting occurs in the same manner as the waiting in the capacity eviction (described below). Note that an ownership eviction works identically to an upgrade eviction, except that no entry (A, p, Shared) should exist in the case of the ownership eviction.

The following steps may occur during a capacity eviction: (1) choose an entry (A', p', State), using some approximation to least recently used; (2) send an eviction request to p'; (3) p' receives the eviction request and initiates an "Evict" or "Modified" request as described above; (4) when an evict request is received from p', the capacity eviction is complete. The evict request should be handled as described above.

The following steps may occur during a downgrade request for data at address (A') and processor (p'): (1) a downgrade request is sent to p'; (2) p' receives a downgrade request and initiates a Writeback, Modified, or Evict request as described above; and (3) when the Writeback, Modified, or Evict request is received, the downgrade request is complete. The writeback, modified, and Evict request are described above.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system comprising:
a memory;
a first processor operatively connected to a first cache;
a second processor operatively connected to a second cache; and
a directory implemented in hardware operatively connected to the first cache, the second cache, and the memory,
wherein the directory comprises at least one location,
wherein the at least one location is configured to store a first entry and a second entry,
wherein the first entry comprises a first address field, a first processor field, and a first state field, and
wherein the first processor field stores a value corresponding to the first processor and a value corresponding to the second processor, if the first address field stores a first physical address and a first cache entry in the first cache is associated with the first physical address and a second cache entry in the second cache is associated with the first physical address.

2. The system of claim 1, further comprising:
a buffer operatively connected to the directory and configured to store the first entry after the first entry is evicted from the directory.

3. The system of claim 1, wherein the directory is configured to evict the first entry from the directory and store the first entry in a buffer operatively connected to the directory.

4. The system of claim 1, wherein the directory is configured to implement a cache-coherency protocol.

5. The system of claim 4, wherein the cache-coherency protocol comprises at least one selected from the group consisting of a Modified-Shared-Invalid protocol, a Modified-Exclusive-Shared-Invalid protocol, and a Modified-Owned-Exclusive-Shared-Invalid protocol.

6. The system of claim 1, wherein the directory is located in a memory controller associated with the memory.

7. A system comprising:
a memory;
a first processor operatively connected to a first cache;
a second processor operatively connected to a second cache; and
a directory implemented in hardware operatively connected to the first cache, the second cache, and the memory,
wherein the directory comprises at least one location,
wherein the at least one location is configured to store a first entry and a second entry,
wherein a first physical address associated with a first cache entry in the first cache and a second physical address associated with a second cache entry in the first cache index to the at least one location, and
wherein the first physical address of the first cache entry is stored in a first address field of the first entry, a value corresponding to the first processor is stored in a first processor field of the first entry, the second physical address of the second cache entry is stored in a second address field of the second entry, and the value corresponding to the first processor is stored in a second processor field of the second entry.

8. The system of claim 7, wherein a first set of low-order bits in the first physical address, and second set of low-order bits in the second physical address are used to index into the at least one location.

9. The system of claim 7, further comprising:
a buffer operatively connected to the directory and configured to store the first entry after the first entry is evicted from the directory.

10. The system of claim 7, wherein the directory is configured to evict the first entry from the directory and store the first entry in a buffer operatively connected to the directory.

11. The system of claim 7, wherein the directory is configured to implement a cache-coherency protocol.

12. The system of claim 11, wherein the cache-coherency protocol comprises at least one selected from the group consisting of a Modified-Shared-Invalid protocol, a Modified-Exclusive-Shared-Invalid protocol, and a Modified-Owned-Exclusive-Shared-Invalid protocol.

13. The system of claim 7, wherein the directory is located in a memory controller associated with the memory.

14. A system comprising:
a memory;
a first processor operatively connected to a first cache;
a second processor operatively connected to a second cache; and
a directory implemented in hardware operatively connected to the first cache, the second cache, and the memory,
wherein the directory comprises at least one location,
wherein the at least one location is configured to store a first entry and a second entry,
wherein a first physical address of a first cache entry in the first cache and a second physical address of a second cache entry in the second cache index to the at least one location, and
wherein the first physical address of the first cache entry is stored in a first address field of the first entry, a value corresponding to the first processor is stored in a first processor field of the first entry, the second physical address of the second cache entry is stored in a second address field of the second entry, and a value corresponding to the second processor is stored in a second processor field of the second entry.

15. The system of claim 14, wherein a first set of low-order bits in the first physical address, and second set of low-order bits in the second physical address are used to index into the at least one location.

16. The system of claim 14, further comprising:
a buffer operatively connected to the directory and configured to store the first entry after the first entry is evicted from the directory.

17. The system of claim 14, wherein the directory is configured to evict the first entry from the directory and store the first entry in a buffer operatively connected to the directory.

18. The system of claim 14, wherein the directory is configured to implement a cache-coherency protocol.

19. The system of claim 18, wherein the cache-coherency protocol comprises at least one selected from the group consisting of a Modified-Shared-Invalid protocol, a Modified-Exclusive-Shared-Invalid protocol, and a Modified-Owned-Exclusive-Shared-Invalid protocol.

20. The system of claim 14, wherein the directory is located in a memory controller associated with the memory.

* * * * *